(12) United States Patent
Chou et al.

(10) Patent No.: US 9,113,083 B1
(45) Date of Patent: Aug. 18, 2015

(54) IMAGE ADJUSTING SYSTEM WITH MULTIPLE LENS MODULES AND METHOD THEREOF

(71) Applicant: Altek Semiconductor Corporation, Hsinchu (TW)

(72) Inventors: Hong-Long Chou, Taipei (TW); Che-Lun Chuang, Hsinchu (TW); Chia-Chun Tseng, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/305,531

(22) Filed: Jun. 16, 2014

(30) Foreign Application Priority Data

Apr. 30, 2014 (TW) .............................. 103115508 A

(51) Int. Cl.
*H04N 5/232* (2006.01)
*G06T 7/00* (2006.01)

(52) U.S. Cl.
CPC .......... *H04N 5/23296* (2013.01); *G06T 7/0018* (2013.01); *H04N 5/23212* (2013.01); *G06T 2207/10004* (2013.01); *G06T 2207/10148* (2013.01)

(58) Field of Classification Search
CPC .................................................. H04N 5/23209
See application file for complete search history.

(56) References Cited

U.S. PATENT DOCUMENTS

| | | | | |
|---|---|---|---|---|
| 5,793,482 A * | 8/1998 | Tseng et al. | ................... | 356/124 |
| 6,618,559 B1 * | 9/2003 | Hofer | ............... | 396/87 |
| 6,826,361 B1 * | 11/2004 | Yost | ................ | 396/97 |
| 2002/0114230 A1 * | 8/2002 | Kadlec et al. | .............. | 369/44.29 |

* cited by examiner

*Primary Examiner* — James Hannett
(74) *Attorney, Agent, or Firm* — Bacon & Thomas, PLLC

(57) ABSTRACT

The present disclosure illustrates an image adjusting system with multiple lens modules and method thereof. The system is adapted for an image capturing device having a zoom lens module and a prime lens module. When the zoom lens module and the prime lens module captures a first image and a second image, the image adjusting system can select a first reference calibration parameter table from multiple first calibration parameter tables, and search a current focus parameter from a focus parameter lookup table according to a current motor step, and then multiply the second image, the first reference calibration parameter table and the current focus parameter to generate a third image. Therefore, the third image has substantially consistent with the first image.

10 Claims, 4 Drawing Sheets

IMAGE ADJUSTING SYSTEM WITH MULTIPLE LENS MODULES AND METHOD THEREOF

CROSS-REFERENCE TO RELATED APPLICATION

This application claims the benefit of Taiwan Patent Application No. 103115508, filed on Apr. 30, 2014, in the Taiwan Intellectual Property Office, the disclosure of which is incorporated herein in its entirety by reference.

BACKGROUND OF THE INVENTION

1. Field of the Invention

The present disclosure relates to an image adjusting system, in particular to an image adjusting system adapted for multiple lens modules and the method thereof.

2. Description of the Related Art

With great improvement of the optical technology and image process technology, more applications incorporating the multiple lens modules are implemented on the portable device, such as three dimensional image capture application, depth calculation application. However, due to consideration for cost and space limitation of the portable device, most designs for dual lens modules utilize combination of heterogeneous lens modules, such as a main lens module incorporating with a small lens module, or a zoom lens module incorporating with a prime lens module.

The image characteristics of heterogeneous lens modules are usually different, such as different resolutions, different focuses, or different distort degrees, and these differences will impair the subsequent image process, for example, the difference will result in failure of feature search. Therefore, when the portable device is installed with heterogeneous lens modules, what is need is to improve consistency between two heterogeneous lens modules for facilitating the subsequent image process application.

SUMMARY OF THE INVENTION

To solve the above-mentioned problems, one of objectives of the present disclosure is to provide an image adjusting system with multiple lens modules and method thereof, so as to improve image consistency between multiple lens modules.

The other objective of the present disclosure is to provide an image adjusting system with multiple lens modules and method thereof, so as to reduce amount of computation required for adjusting the image captured by the multiple lens modules.

An exemplary embodiment of the present disclosure provides an image adjusting system with multiple lens modules adapted for an image capture device having a zoom lens module and a prime lens module. The image adjusting system comprises a calibration data storage module, a focus determination module, and an image consistency correction module. The calibration data storage module stores a plurality of first calibration parameter tables corresponding to different focus parameters for the prime lens module, and stores a focus parameter lookup table which records a corresponding relationship between motor steps and the focus parameters. The focus determination module obtains a current motor step of the zoom lens module, and searches a current focus parameter corresponding to the current motor step according to the focus parameter lookup table. When the zoom lens module and the prime lens module capture a first image and a second image respectively, the image consistency correction module selects a first reference calibration parameter table from the plurality of first calibration parameter tables according to the current focus parameter searched by the focus determination module, and multiplies the second image, the first reference calibration parameter table and the current focus parameter to generate a third image which has substantial consistency with the first image.

Preferably, the first calibration parameter table is formed by an image distortion correction table, a geometry calibration table and a focus conversion table.

Preferably, the image distortion correction tables are multiple in number, and a plurality of image distortion correction tables correspond to different focus parameters, respectively.

Preferably, the calibration data storage module further stores a plurality of second calibration parameter tables corresponding to different focus parameters for the zoom lens module, and the image consistency correction module selects a second reference calibration parameter table from the plurality of second calibration parameter tables according to the current focus parameter searched by the focus determination module, and multiplies the first image, the second reference calibration parameter table and the current focus parameter to generate a fourth image which has substantial consistency with the third image.

An exemplary embodiment of the present disclosure provides an image adjusting method with multiple lens modules adapted for an image capture device having a zoom lens module and a prime lens module. The image adjusting method comprise following steps of: executing a calibration process which comprises steps of: placing a calibration model in front of the zoom lens module and the prime lens module, and then moving the calibration model to different positions respectively, and controlling the zoom lens module to focus on the calibration model for calibration, and calculating a plurality of focus parameters; obtaining a plurality of motor steps of the zoom lens module during focusing to establish a focus parameter lookup table which records a corresponding relationship between a plurality of motor steps and a plurality of focus parameters; calibrating the prime lens module according to the calibration model at different positions for calculating a plurality of first calibration parameter tables. Next, executing an image consistency correction process which comprises the steps of: using the zoom lens module and the prime lens module to capture a first image and a second image, respectively; obtaining a current motor step of the zoom lens module, and searching a current focus parameter corresponding to the current motor step according to the focus parameter lookup table; selecting a first reference calibration parameter table from the plurality of first calibration parameter tables according to the current focus parameter; multiplying the second image, the first reference calibration parameter table and the current focus parameter, to generate a third image which has substantial consistency with the first image.

Preferably, the first calibration parameter table is formed by an image distortion correction table, a geometry calibration table and a focus conversion table.

Preferably, the image distortion correction tables are multiple in number, and a plurality of image distortion correction tables correspond to different focus parameters, respectively.

Preferably, when the zoom lens module is larger than the prime lens module in resolution, the calibration process further comprises a step of cutting a calibration image from the image captured by the zoom lens module according to an image size of the prime lens module, and then performing calibration based on the calibration image.

Preferably, the calibration process further comprises a step of: calibrating the zoom lens module according to the calibration model at different positions, to generate a plurality of second calibration parameter tables.

Preferably, the image consistency correction process further comprises steps of selecting a second reference calibration parameter table from the plurality of second calibration parameter tables according to the current focus parameter; multiplying the and first image, the second reference calibration parameter table and the current focus parameter, to generate a fourth image which has substantial consistency with the third image.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
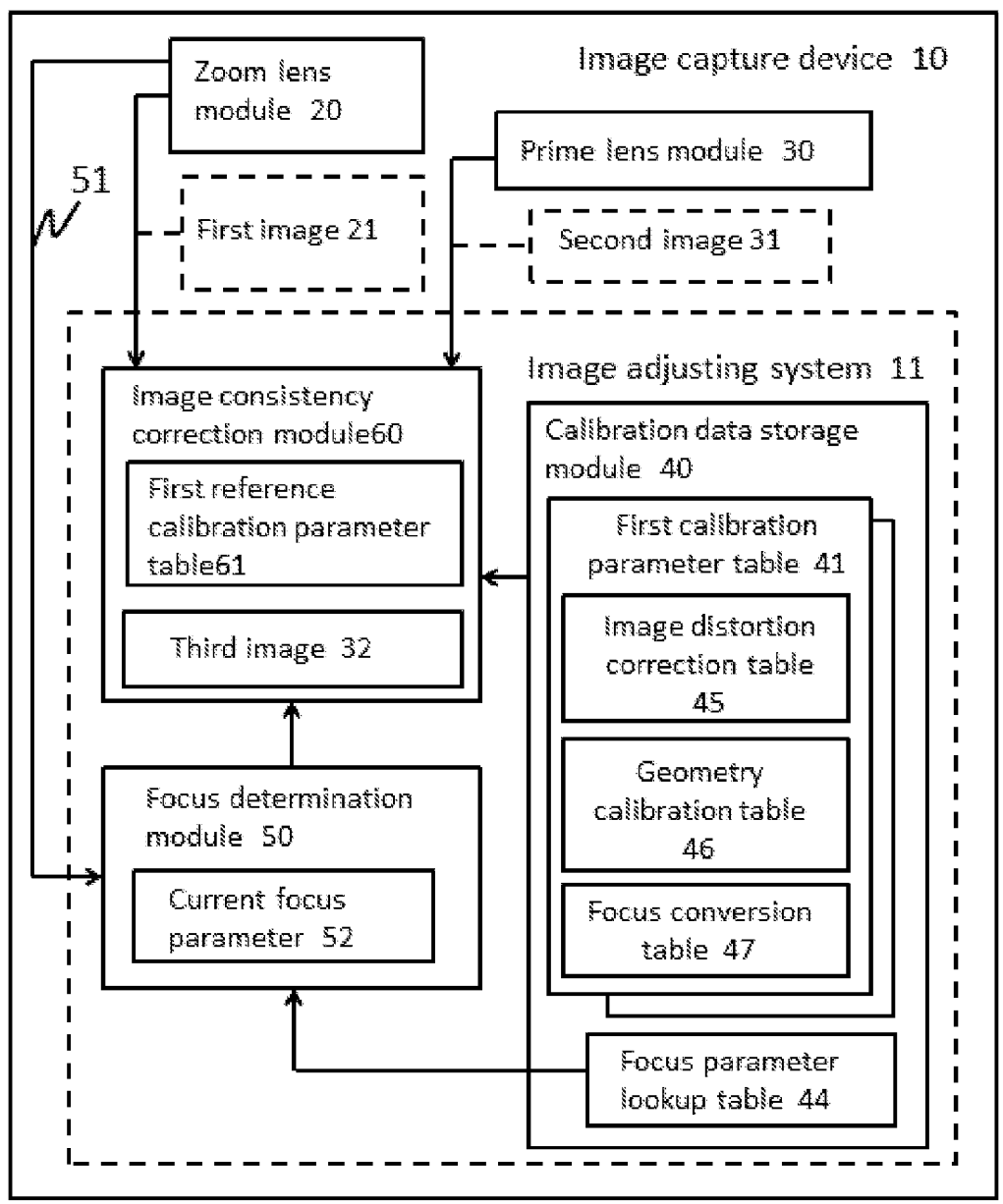
FIG. 1 is a block diagram of a first embodiment of an image adjusting system with multiple lens modules of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which is a block diagram of a first embodiment of an image adjusting system with multiple lens modules of the present disclosure. An image adjusting system 11 is adapted for an image capture device 10 having a zoom lens module 20 and a prime lens module 30. The image adjusting system 11 comprises a calibration data storage module 40, a focus determination module 50, and an image consistency correction module 60.

The calibration data storage module 40 is operative to store a plurality of first calibration parameter tables 41 corresponding to different focus parameters 42 for the prime lens module 30. In implementation, the first calibration parameter table 41 is formed by an image distortion correction table 45, a geometry calibration table 46 and a focus conversion table 47. The image distortion correction tables are multiple in number upon demand, and the plurality of image distortion correction tables correspond to different focus parameters 42, respectively.

The calibration data storage module 40 also stores a focus parameter lookup table 44 which records a corresponding relationship between motor steps and the focus parameters 42.

The focus determination module 50 is operative to obtain a current motor step 51 of the zoom lens module 20, and searches a current focus parameter 52 corresponding to the current motor step 51 from the focus parameter lookup table 44.

When the zoom lens module 20 and the prime lens module 30 capture a first image 21 and a second image 31 respectively, the image consistency correction module 60 is operative to select a first reference calibration parameter table 61 from the plurality of first calibration parameter tables 41 according to the current focus parameter 52 searched by the focus determination module 50, and multiply the second image 31, the first reference calibration parameter table 61 and the current focus parameter 52 to generate a third image 32 which has substantial consistency with the first image 21.

In addition, the calibration data storage module 40 can further store a plurality of second calibration parameter tables corresponding to different focus parameters for the zoom lens module 20, and the image consistency correction module 60 selects a second reference calibration parameter table from the plurality of second calibration parameter tables according to the current focus parameter 52 searched by the focus determination module 50, and multiplies the first image 21, the second reference calibration parameter table and the current focus parameter 52 to generate a fourth image which has substantial consistency with the third image 32.

Figure 2:
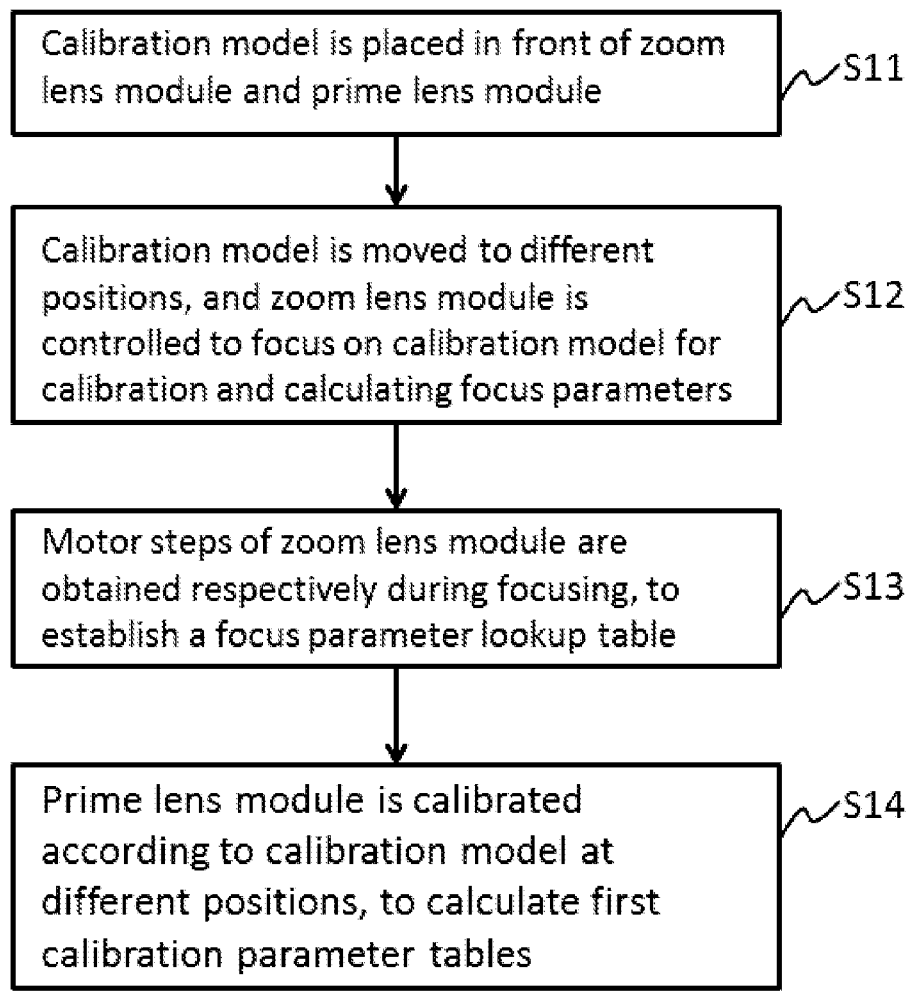
FIG. 2 is a flow diagram of a calibration process of an image adjusting method with multiple lens modules of the present disclosure.
Figure 3:
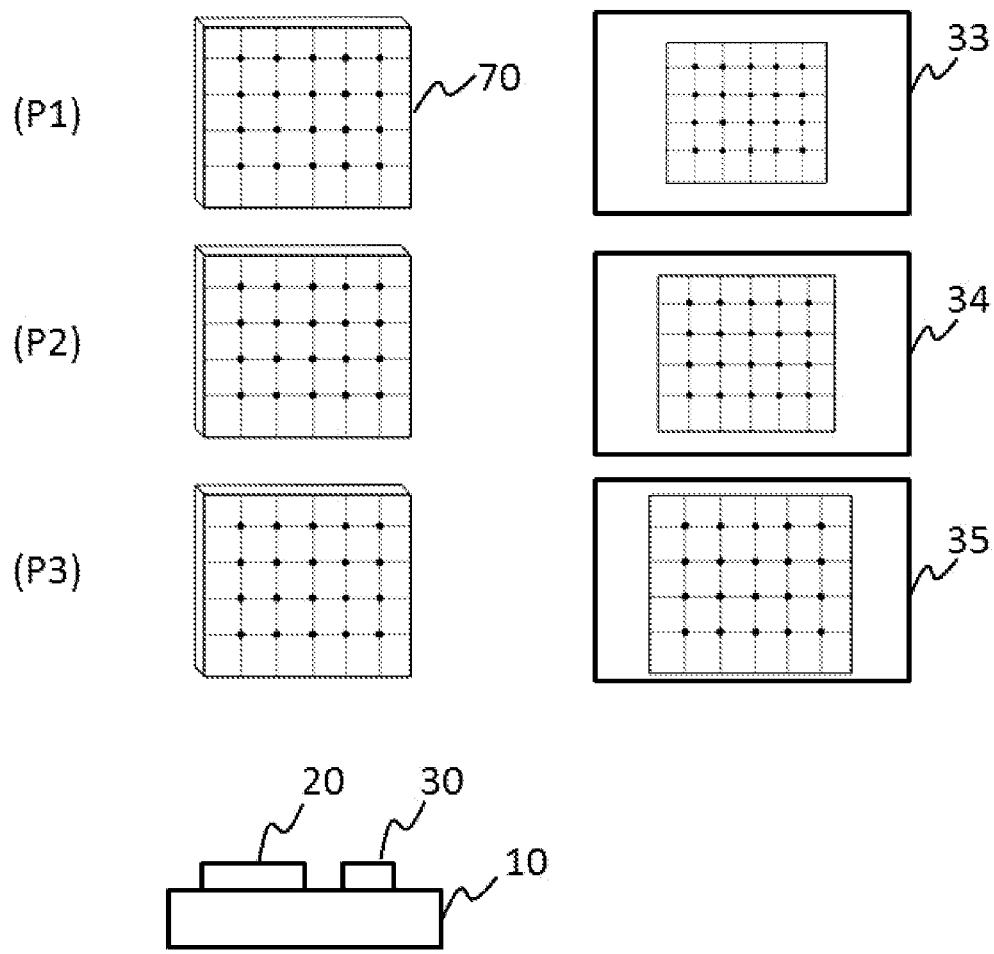
FIG. 3 is an operation schematic view of the calibration process of the image adjusting method with multiple lens modules of the present disclosure.

Please refer to FIG. 2 and FIG. 3 which are flow diagram and operation schematic view of image adjusting method with multiple lens modules of the present disclosure. In these FIGs, the image adjusting method is illustrated by cooperating with FIG. 1. The image adjusting method is adapted for the image capture device 10 having the zoom lens module 20 and the prime lens module 30. The image adjusting method mainly comprises a calibration process and an image consistency correction process. The calibration process comprises following steps.

In step S11, a calibration model 70 is placed in front of the zoom lens module 20 and the prime lens module 30. As shown in FIG. 3, the calibration model 70 comprises lines in array, but it is just for example, the present disclosure is not limited thereto. Next, in step S12, the calibration model 70 is moved to different positions respectively, and the zoom lens module 20 is correspondingly controlled to focus on the calibration model 70 for calibration and calculating a plurality of focus parameters 42.

As shown in FIG. 3, the calibration model 70 is respectively placed in positions P1~P3 for calibration in step S12. The zoom lens module 20 can change its focus, so the stepper motor of the zoom lens module 20 can be controlled respectively to move optic lens elements of the zoom lens module 20 for focusing according to the calibration model 70 at positions P1~P3, and the motor step corresponding to each focusing is recorded. The image is captured for calibration after each focusing, so as to calculate a plurality of focus parameters 42.

In step S13, a plurality of motor steps of the zoom lens module 20 are obtained respectively during focusing, to establish a focus parameter lookup table 44 which records a corresponding relationship between a plurality of motor steps and a plurality of focus parameters 42.

In step S14, the prime lens module 30 is calibrated according to the calibration model 70 at different positions, to calculate a plurality of first calibration parameter tables 41. As shown in FIG. 3, the prime lens module 30 captures the calibration image 33~35 for the calibration model 70 at positions P1~P3, respectively. The images of the calibration model 70 shown in the calibration images 33~35 have different sizes.

In implementation, if the resolution of the zoom lens module 20 is larger than that of the prime lens module 30, in the step S12 to the step S14, an appropriate image can be cut from the image captured by the zoom lens module 20 according to the size of images of the calibration model 70 in the calibration images 33~35, whereby the consistency of adjusted images can be improved.

After the step S11 to the step S14 is executed, the generated first calibration parameter table 41 can be used to adjust the image captured by the prime lens module 30 to have more consistency with the image captured by the zoom lens module 20.

The user may arbitrarily and continuously adjust the focus of the zoom lens module 20 of the image capture device 10 while shooting picture, however, only calibrations for several focuses are performed in calibration process. Therefore, the motor step and the focus parameter 42 are used to maintain the consistency between the images captured by the prime lens module 30 and the zoom lens module 20 in practical condition of picture shooting. The detailed illustration is described in the following paragraph.

Figure 4:
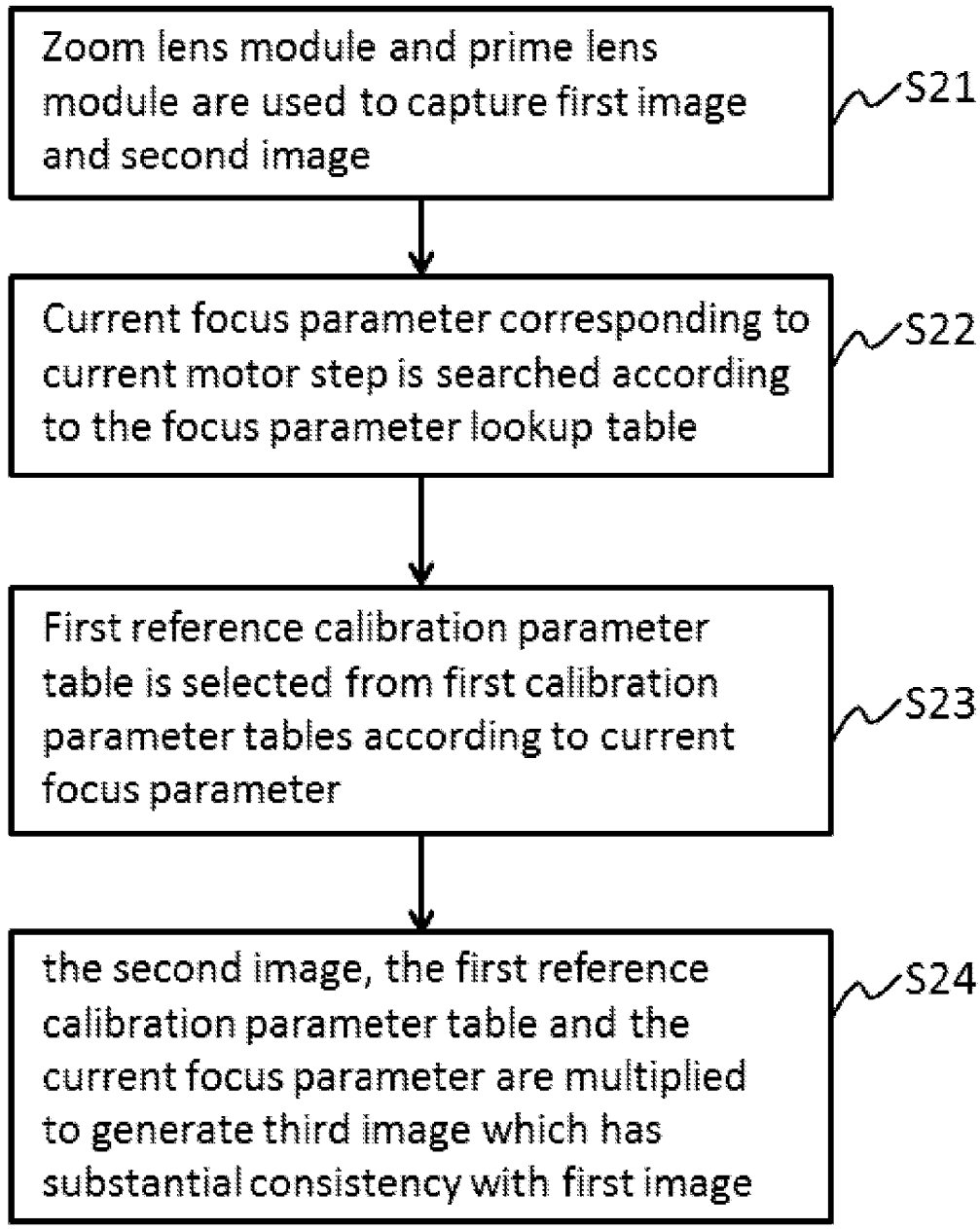
FIG. 4 is a flow diagram of an image consistency correction process of the image adjusting method with multiple lens modules of the present disclosure.

Please refer to FIG. 4 which is a flow diagram of an image consistency correction process of the image adjusting method with multiple lens modules of the present disclosure. The third embodiment is illustrated by cooperating with the FIG. 1, and comprises the following steps. In step S21, the zoom lens module 20 and the prime lens module 30 are used to capture a first image 21 and a second image 31, respectively.

In step S22, a current motor step 51 of the zoom lens module 20 is obtained, and a current focus parameter 52 corresponding to the current motor step 51 is searched according to the focus parameter lookup table 44. In step S23, a first reference calibration parameter table 61 is selected from the plurality of first calibration parameter tables 41 according to the current focus parameter 52.

In step S24, the second image 31, the first reference calibration parameter table 61 and the current focus parameter 52 are multiplied to generate a third image 32 which has substantial consistency with the first image 21.

Therefore, if the focus of the zoom lens module 20 is adjusted arbitrarily in the practical condition of picture shooting, the current motor step 51 can be transformed to a current focus parameter 52 which can be used to select a more appropriate first reference calibration parameter table 61 to adjust the second image 31.

In addition, when the zoom lens module 20 is controlled to calibrate according to the calibration model at different positions in the calibration process, to generate and store a plurality of second calibration parameter tables, in the image consistency correction process a second reference calibration parameter table can be selected from the plurality of second calibration parameter tables according to the current focus parameter 52, and the first image 21, the second reference calibration parameter table and the current focus parameter 52 can be multiplied to generate a fourth image which has substantial consistency with the third image 32.

To sum up, the image adjusting system with multiple lens modules of the present disclosure and the method thereof can efficiently improve consistency between two heterogeneous lens modules, so as to facilitate the subsequent image process application.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An image adjusting system with multiple lens modules, adapted for an image capture device having a zoom lens module and a prime lens module, and the image adjusting system comprising:
   a calibration data storage module, configured for storing a plurality of first calibration parameter tables corresponding to different focus parameters for the prime lens module, and storing a focus parameter lookup table recording a corresponding relationship between motor steps and the focus parameters;
   a focus determination module, configured for obtaining a current motor step of the zoom lens module, and searching a current focus parameter corresponding to the current motor step according to the focus parameter lookup table; and
   an image consistency correction module, wherein when the zoom lens module and the prime lens module capture a first image and a second image respectively, the image consistency correction module selects a first reference calibration parameter table from the plurality of first calibration parameter tables according to the current focus parameter searched by the focus determination module, and multiplies the second image, the first reference calibration parameter table and the current focus parameter to generate a third image which has substantial consistency with the first image.

2. The image adjusting system as defined in claim 1, wherein the first calibration parameter table is formed by an image distortion correction table, a geometry calibration table and a focus conversion table.

3. The image adjusting system as defined in claim 2, wherein the image distortion correction tables are multiple in number, and the plurality of image distortion correction tables correspond to different focus parameters, respectively.

4. The image adjusting system as defined in claim 1, wherein the calibration data storage module further stores a plurality of second calibration parameter tables corresponding to different focus parameters for the zoom lens module, and the image consistency correction module selects a second reference calibration parameter table from the plurality of second calibration parameter tables according to the current focus parameter searched by the focus determination module, and multiplies the first image, the second reference calibration parameter table and the current focus parameter to generate a fourth image which has substantial consistency with the third image.

5. An image adjusting method with multiple lens modules, adapted for an image capture device having a zoom lens module and a prime lens module, and the image adjusting method comprising:

executing a calibration process which comprises:

placing a calibration model in front of the zoom lens module and the prime lens module, and then moving the calibration model to different position respectively, and controlling the zoom lens module to focus on the calibration model for calibration, and calculating a plurality of focus parameters;

obtaining a plurality of motor steps of the zoom lens module during focusing, to establish a focus parameter lookup table which records the corresponding relationship between the plurality of motor steps and the plurality of focus parameters; and calibrating the prime lens module according to the calibration model at different positions, to calculating a plurality of first calibration parameter tables;

executing an image consistency correction process which comprises:

using the zoom lens module and the prime lens module to capture a first image and a second image, respectively;

obtaining a current motor step of the zoom lens module, and searching a current focus parameter corresponding to the current motor step according to the focus parameter lookup table;

selecting a first reference calibration parameter table from the plurality of first calibration parameter tables according to the current focus parameter; and multiplying the second image, the first reference calibration parameter table and the current focus parameter, to generate a third image which has substantial consistency with the first image.

6. The image adjusting method as defined in claim 5, wherein the first calibration parameter table is formed by an image distortion correction table, a geometry calibration table and a focus conversion table.

7. The image adjusting method as defined in claim 6, wherein the image distortion correction tables are multiple in number, the plurality of image distortion correction tables correspond to different focus parameters, respectively.

8. The image adjusting method as defined in claim 5, wherein when the zoom lens module is larger than the prime lens module in resolution, the calibration process further comprises a step of:

cutting a calibration image from the image captured by the zoom lens module according to an image size of the prime lens module, and performing calibration based on the calibration image.

9. The image adjusting method as defined in claim 5, wherein the calibration process further comprises a step of:

calibrating the zoom lens module according to the calibration model at different positions, to generate a plurality of second calibration parameter tables.

10. The image adjusting method as defined in claim 9, wherein the image consistency correction process further comprises:

selecting a second reference calibration parameter table from the plurality of second calibration parameter tables according to the current focus parameter; and multiplying the first image, the second reference calibration parameter table and the current focus parameter, to generate a fourth image which has substantial consistency with the third image.

* * * * *